United States Patent
Hanneman et al.

(10) Patent No.: US 12,374,871 B2
(45) Date of Patent: Jul. 29, 2025

(54) SINGLE COMPONENT LOCK MECHANISM OF A PEDESTAL

(71) Applicant: PREFORMED LINE PRODUCTS CO., Mayfield Village, OH (US)

(72) Inventors: Andrew James Hanneman, Twinsburg, OH (US); Christopher Stephen Grubish, Solon, OH (US); Randy G. Cloud, Mentor, OH (US)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 144 days.

(21) Appl. No.: 18/202,738

(22) Filed: May 26, 2023

(65) Prior Publication Data

US 2024/0396310 A1 Nov. 28, 2024

(51) Int. Cl.
*H02B 1/00* (2006.01)
*E05B 65/00* (2006.01)
*H02B 1/50* (2006.01)

(52) U.S. Cl.
CPC .............. *H02B 1/50* (2013.01); *E05B 65/00* (2013.01)

(58) Field of Classification Search
CPC ................................. H02B 1/50; E05B 65/00
See application file for complete search history.

(56) References Cited

U.S. PATENT DOCUMENTS

| | | |
|---|---|---|
| 3,797,870 A | 3/1974 | Beckman |
| 3,858,755 A | 1/1975 | Tellen |
| 4,428,605 A | 1/1984 | Follows |
| 4,534,586 A | 8/1985 | Smith et al. |
| 4,585,141 A | 4/1986 | Marks |
| 5,412,960 A | 5/1995 | James et al. |
| 5,583,612 A | 12/1996 | Schell et al. |
| 5,603,535 A | 2/1997 | Antonucci et al. |
| 6,182,846 B1 * | 2/2001 | Leschinger .............. H02B 1/50 174/37 |
| 6,349,578 B1 | 2/2002 | Tuvy et al. |
| 7,357,009 B2 | 4/2008 | Maloney et al. |
| 8,220,298 B2 | 7/2012 | Burke et al. |
| 8,562,082 B2 | 10/2013 | Liu et al. |
| 8,739,998 B2 | 6/2014 | Chen et al. |
| 9,200,478 B2 | 12/2015 | Connell |
| 9,297,186 B2 * | 3/2016 | Chen ......................... E05C 1/12 |
| 2008/0253062 A1 * | 10/2008 | Seff ......................... H02B 1/50 361/622 |
| 2021/0185840 A1 | 6/2021 | Honsinger |

FOREIGN PATENT DOCUMENTS

EP 1072744 A1 1/2001

* cited by examiner

*Primary Examiner* — Pete T Lee
(74) *Attorney, Agent, or Firm* — Cooper Legal Group, LLC (57) ABSTRACT

A single, unitary component for a pedestal that houses utility/communication lines/connections. The unitary component includes a tool engageable portion for rotation thereby and a hooked finger extending from the tool engageable portion and moving in an arc during rotation for engagement with a catch. The single, unitary component includes a resilient finger integral to and extending from at least one of the tool engageable portion or the hooked finger and having an engagement distal end. The engagement distal end of the resilient finger is engageable with a surface with the resilient finger resiliently deforming during rotation of the single, unitary component in a rotational direction to move the hook away from the catch and the resilient finger resiliently biasing the hook toward interaction with the catch.

20 Claims, 8 Drawing Sheets

SINGLE COMPONENT LOCK MECHANISM OF A PEDESTAL

FIELD

The present disclosure relates generally to pedestals that house utility/communication lines, connections for such utility/communication lines and the like.

BACKGROUND

Pedestals are utilized to house utility/communication lines, connections and the like. Pedestals provide a hollow interior within which the utility/communication lines, connections and the like are housed and thus protected from weather elements, tampering and other unwanted activities. Typically, pedestals include a manner in which the hollow interior is accessed. Such access may be in the form of an access panel or door, or such access may be in the form of a multi (e.g., two) part construction. The multi (e.g., two) part construction is disassembled to access the hollow interior and is assembled to enclose the hollow interior.

Regardless of the type of access (e.g., door or multi part construction), Pedestals typically have an arrangement to secure the access (e.g., door or multi part construction) in a closed/enclosed condition. Within a typical securing arrangement, a rotational member (e.g., a rotational nut member or other type of keyed member) is rotationally actuatable (e.g., via a specialized tool) to operate a multi-component mechanical arrangement. The multi-component mechanical arrangement ultimately includes a component that permits an opening/removal condition or prevents such, dependent upon rotational position of the rotational member and operation of the multi-component mechanical arrangement.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In accordance with an aspect, the present disclosure provides a pedestal to securely house at least one of utility/communication lines or connections therefor. The pedestal includes a first pedestal housing portion. The pedestal includes a second pedestal housing portion. The second pedestal housing portion is movable relative to the first pedestal housing portion between an open condition and a closed condition. The first pedestal housing portion and the second pedestal housing portion provide an interior for the at least one of utility/communication lines or connections therefor. The pedestal includes a mechanical arrangement to secure the second pedestal housing portion to the first pedestal housing portion in the closed condition. The mechanical arrangement includes a single, unitary component rotationally mounted relative to one of the first pedestal housing portion or the second pedestal housing portion. The mechanical arrangement includes a component housing associated with the single, unitary component and fixed relative to the one of the first pedestal housing portion or the second pedestal housing portion. The mechanical arrangement includes a catch located on the other of the first pedestal housing portion or the second pedestal housing portion. The single, unitary component includes a tool engageable portion for engagement by a tool and rotation of the single, unitary component by the tool. The single, unitary component includes a hooked finger integral to and extending from the tool engageable portion and having a hook at a distal end of the hooked finger away from the tool engageable portion. The hook moves in an arc about the tool engageable portion during rotation of the single, unitary component. When the first pedestal housing portion and the second pedestal housing portion are in the closed condition, the hook may interact with the catch to inhibit the second pedestal housing portion from moving relative to the first pedestal housing portion to the open condition. The single, unitary component includes a resilient finger integral to and extending from at least one of the tool engageable portion or the hooked finger and having an engagement distal end. The engagement distal end of the resilient finger is engageable with a surface of the component housing with the resilient finger resiliently deforming during rotation of the single, unitary component in a rotational direction to move the hook away from the catch and the resilient finger resiliently biasing the hook toward the catch and to interact with the catch to prevent the second pedestal housing portion from moving relative to the first pedestal housing portion to the open condition.

In accordance with an aspect, the present disclosure provides a mechanical arrangement for a pedestal that securely houses at least one of utility/communication lines or connections therefor, where the pedestal includes a first pedestal housing portion and a second pedestal housing portion, and the second pedestal housing portion is movable relative to the first pedestal housing portion between an open condition and a closed condition. The mechanical arrangement includes a single, unitary component rotationally mounted relative to one of the first pedestal housing portion or the second pedestal housing portion. The mechanical arrangement includes a component housing associated with the single, unitary component and fixed relative to the one of the first pedestal housing portion or the second pedestal housing portion. The mechanical arrangement includes a catch located on the other of the first pedestal housing portion or the second pedestal housing portion. The single, unitary component includes a tool engageable portion for engagement by a tool and rotation of the single, unitary component by the tool. The single, unitary component includes a hooked finger integral to and extending from the tool engageable portion and having a hook at a distal end of the hooked finger away from the tool engageable portion. The hook moves in an arc about the tool engageable portion during rotation of the single, unitary component. When the first pedestal housing portion and the second pedestal housing portion are in the closed condition, the hook may interact with the catch to inhibit the second pedestal housing portion from moving relative to the first pedestal housing portion to the open condition. The single, unitary component includes a resilient finger integral to and extending from at least one of the tool engageable portion or the hooked finger and having an engagement distal end. The engagement distal end of the resilient finger is engageable with a surface of the component housing with the resilient finger resiliently deforming during rotation of the single, unitary component in a rotational direction to move the hook away from the catch and the resilient finger resiliently biasing the hook toward the catch to interact with the catch to inhibit the second pedestal housing portion from moving relative to the first pedestal housing portion to the open condition.

In accordance with an aspect, the present disclosure provides a single, unitary component of a mechanical arrangement. The mechanical arrangement includes a component housing associated with the single, unitary component and fixed relative to one of a first housing portion or a second housing portion. The mechanical arrangement includes a catch located on the other of the first housing portion or the second housing portion. The single, unitary component includes a tool engageable portion for engagement by a tool and rotation of the single, unitary component by the tool. The single, unitary component includes a hooked finger integral to and extending from the tool engageable portion and having a hook at a distal end of the hooked finger away from the tool engageable portion. The hook moves in an arc about the tool engageable portion during rotation of the single, unitary component. When the first housing portion and the second housing portion are in a closed condition, the hook may interact with the catch to inhibit the second housing portion from moving relative to the first housing portion to the open condition. The single, unitary component includes a resilient finger integral to and extending from at least one of the tool engageable portion or the hooked finger and having an engagement distal end. The engagement distal end of the resilient finger is engageable with a surface of the component housing with the resilient finger resiliently deforming during rotation of the single, unitary component in a rotational direction to move the hook away from the catch and the resilient finger resiliently biasing the hook toward the catch to interact with the catch to inhibit the second housing portion from moving relative to the first housing portion to the open condition.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 1 is a perspective illustration of an example pedestal for housing utility/communication lines, connections for such utility/communication lines, and/or the like.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

Certain terminology is used herein for convenience only and is not to be taken as a limitation on the disclosed subject matter. Relative language used herein is best understood with reference to the drawings, in which like numerals are used to identify like or similar items. Further, in the drawings, certain features may be shown in somewhat schematic form. The drawing sheets, and content contained thereon, are incorporated into this specification, and thus the patent application, by reference.

The following subject matter may be embodied in a variety of different forms, such as methods, devices, components, and/or systems. Accordingly, this subject matter is not intended to be construed as limited to any illustrative embodiments set forth herein as examples. Rather, the embodiments are provided herein merely to be illustrative.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

In accordance with an aspect, the present disclosure provides a pedestal to securely house at least one of utility/communication lines or connections therefor. The pedestal includes a first pedestal housing portion. The pedestal includes a second pedestal housing portion. The second pedestal housing portion is movable relative to the first pedestal housing portion between an open condition and a closed condition. The first pedestal housing portion and the second pedestal housing portion provide an interior for the at least one of utility/communication lines or connections therefor. The pedestal includes a mechanical arrangement to secure the second pedestal housing portion to the first pedestal housing portion in the closed condition. The mechanical arrangement includes a single, unitary component rotationally mounted relative to one of the first pedestal housing portion or the second pedestal housing portion. The mechanical arrangement includes a component housing associated with the single, unitary component and fixed relative to the one of the first pedestal housing portion or the second pedestal housing portion. The mechanical arrangement includes a catch located on the other of the first pedestal housing portion or the second pedestal housing portion. The single, unitary component includes a tool engageable portion for engagement by a tool and rotation of the single, unitary component by the tool. The single, unitary component includes a hooked finger integral to and extending from the tool engageable portion and having a hook at a distal end of the hooked finger away from the tool engageable portion. The hook moves in an arc about the tool engageable portion during rotation of the single, unitary component. When the first pedestal housing portion and the second pedestal housing portion are in the closed condition, the hook may interact with the catch to inhibit the second pedestal housing portion from moving relative to the first pedestal housing portion to the open condition. The single, unitary component includes a resilient finger integral to and extending from at least one of the tool engageable portion or the hooked finger and having an engagement distal end. The engagement distal end of the resilient finger is engageable with a surface of the component housing with the resilient finger resiliently deforming during rotation of the single, unitary component in a rotational direction to move the hook away from the catch and the resilient finger resiliently biasing the hook toward the catch and to interact with the catch to prevent the second pedestal housing portion from moving relative to the first pedestal housing portion to the open condition.

In accordance with an aspect, the present disclosure provides a mechanical arrangement for a pedestal that securely houses at least one of utility/communication lines or connections therefor, where the pedestal includes a first pedestal housing portion and a second pedestal housing portion, and the second pedestal housing portion is movable relative to the first pedestal housing portion between an open condition and a closed condition. The mechanical arrangement includes a single, unitary component rotationally mounted relative to one of the first pedestal housing portion or the second pedestal housing portion. The mechanical arrangement includes a component housing associated with the single, unitary component and fixed relative to the one of the first pedestal housing portion or the second pedestal housing portion. The mechanical arrangement includes a catch located on the other of the first pedestal housing portion or the second pedestal housing portion. The single, unitary component includes a tool engageable portion for engagement by a tool and rotation of the single, unitary component by the tool. The single, unitary component includes a hooked finger integral to and extending from the tool engageable portion and having a hook at a distal end of the hooked finger away from the tool engageable portion. The hook moves in an arc about the tool engageable portion during rotation of the single, unitary component. When the first pedestal housing portion and the second pedestal housing portion are in the closed condition, the hook may interact with the catch to inhibit the second pedestal housing portion from moving relative to the first pedestal housing portion to the open condition. The single, unitary component includes a resilient finger integral to and extending from at least one of the tool engageable portion or the hooked finger and having an engagement distal end. The engagement distal end of the resilient finger is engageable with a surface of the component housing with the resilient finger resiliently deforming during rotation of the single, unitary component in a rotational direction to move the hook away from the catch and the resilient finger resiliently biasing the hook toward the catch to interact with the catch to inhibit the second pedestal housing portion from moving relative to the first pedestal housing portion to the open condition.

In accordance with an aspect, the present disclosure provides a single, unitary component of a mechanical arrangement for a pedestal that securely houses at least one of utility/communication lines or connections therefor. The mechanical arrangement includes a component housing associated with the single, unitary component and fixed relative to one of a first pedestal housing portion of the pedestal or a second pedestal housing portion of the pedestal. The mechanical arrangement includes a catch located on the other of the first pedestal housing portion or the second pedestal housing portion. The single, unitary component includes a tool engageable portion for engagement by a tool and rotation of the single, unitary component by the tool. The single, unitary component includes a hooked finger integral to and extending from the tool engageable portion and having a hook at a distal end of the hooked finger away from the tool engageable portion. The hook moves in an arc about the tool engageable portion during rotation of the single, unitary component. When the first pedestal housing portion and the second pedestal housing portion are in a closed condition, the hook may interact with the catch to inhibit the second pedestal housing portion from moving relative to the first pedestal housing portion to the open condition. The single, unitary component includes a resilient finger integral to and extending from at least one of the tool engageable portion or the hooked finger and having an engagement distal end. The engagement distal end of the resilient finger is engageable with a surface of the component housing with the resilient finger resiliently deforming during rotation of the single, unitary component in a rotational direction to move the hook away from the catch and the resilient finger resiliently biasing the hook toward the catch to interact with the catch to inhibit the second pedestal housing portion from moving relative to the first pedestal housing portion to the open condition.

The present disclosure provides a self-latching lock for a pedestal, such as for fiber optic lines/connections or the like, that uses few components to reduce cost and simply manufacturing assembly. Known locking systems use numerous component parts, creating a complex design that requires assembly to be installed.

The present disclosure provides a single, simplistic component that has a latching arm. As compared to known locking systems, the present disclosure provides a spring function, a torquing function, and a latching function via just one component. Such greatly reduces part count and manufacturing assembly time.

The present disclosure provides just one component (i.e., a single, unitary component) that provides all of the functions of a separate spring component, a separate tool-engageable torquing component and a separate latching component. The single, unitary component may be attached/mounted to a housing portion (e.g., a dome) of a pedestal in such a way that the single, unitary component is able to rotate about a torquing axis. As the housing portion (e.g., dome) is moved (e.g., lowered down) onto another housing portion (e.g., a base) of the pedestal, the single, unitary component is able to move (e.g., possibly including deflection) around a catch component in the other housing portion (e.g., base). Once past the catch component, the spring function of the single, unitary component forces the latching function to provide for self-locking. The single, unitary component may be unlocked by using a tool to rotate the component via the torquing function, allowing it to again bypass the catch in the base and the housing portion (e.g., dome) to be removed.

Figure 1:
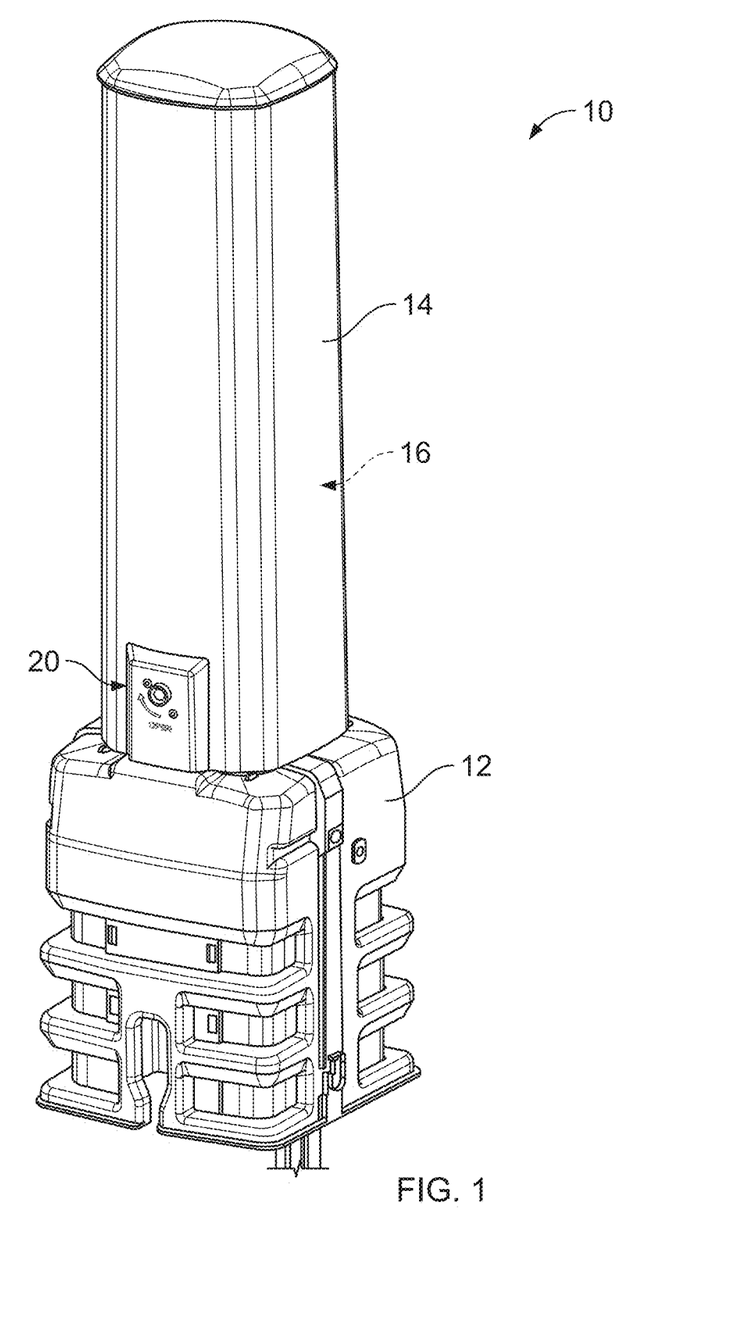
Figure 2:
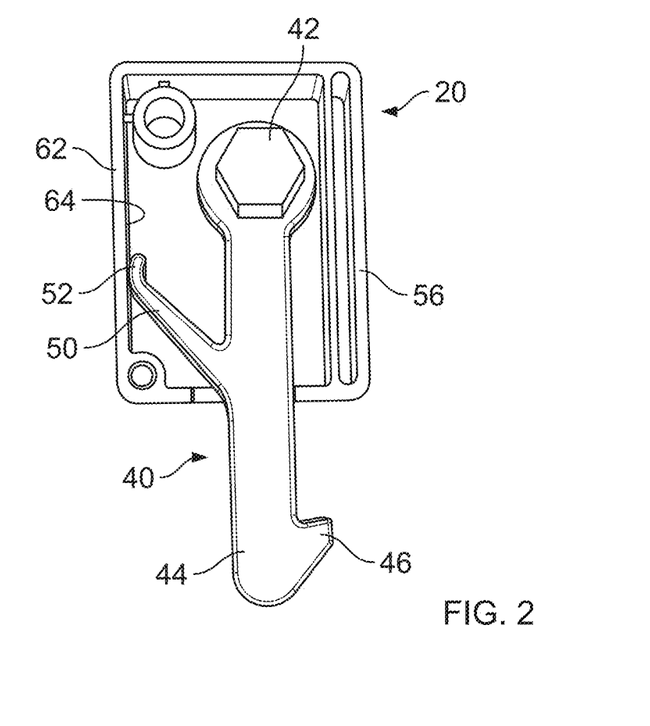
FIG. 2 is a picture of a portion of a mechanical arrangement having a single, unitary component, to secure the access to a pedestal, in accordance with at least one aspect of the present disclosure.
Figure 3:
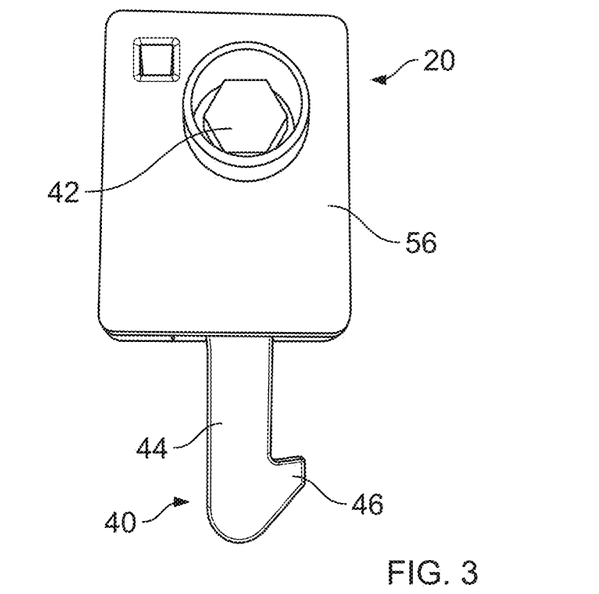
FIG. 3 is a picture similar to FIG. 2, but with a cover of the mechanical arrangement in place.
Figure 4:
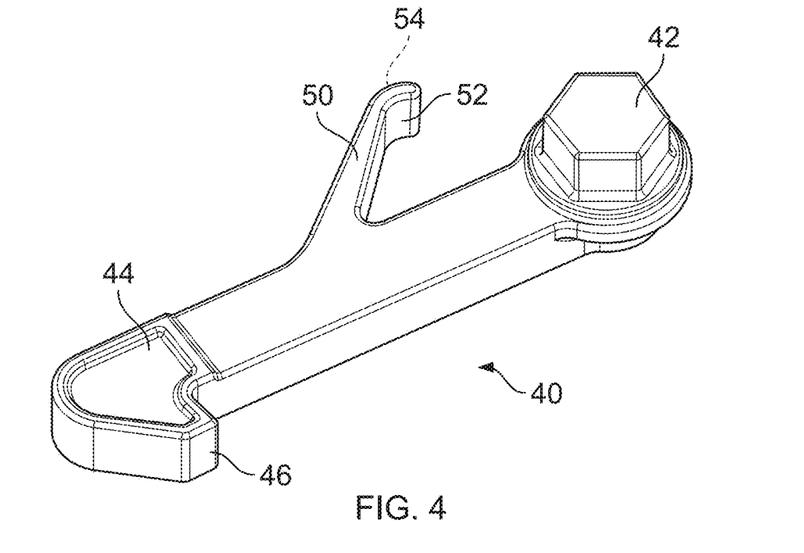
FIG. 4 is a perspective illustration of the single, unitary component in accordance with at least one aspect of the present disclosure.

Focusing now upon FIG. 1, an example pedestal 10 is shown. The pedestal 10 is to securely house at least one of utility/communication lines and connections therefor. Within an example, such lines/connection are fiber optic lines. However, the present disclosure is not limited to application for fiber optic (i.e., the present disclosure is to be broadly interpreted and thus other times of utility/communication lines and connections therefor are within the scope of the present disclosure).

The example pedestal 10 includes a first pedestal housing portion 12 and a second pedestal housing portion 14. The first pedestal housing portion 12 and the second pedestal housing portion 14 provide a hollow interior 16 (hidden in FIG. 1) of the pedestal 10 within which the at least one of utility/communication lines and connections therefor are housed.

The second pedestal housing portion 14 is movable relative to the first pedestal housing portion 12 between an open condition and a closed condition. FIG. 1 shows the example pedestal 10 in a closed condition. The aspect of open condition and closed condition is to be broadly interpreted and may depend upon the construction and configuration of the first pedestal housing portion 12 and the second pedestal housing portion 14. Within the shown example, the movement of the second pedestal housing portion 14 relative to the first pedestal housing portion 12 includes a vertical movement of the second pedestal housing portion 14 relative to the first pedestal housing portion 12. For example, the second pedestal housing portion 14 may be lifted (i.e., moved) vertically upward to separate the second pedestal housing portion 14 from the first pedestal housing portion 12. With the second pedestal housing portion 14 lifted and separated from the first pedestal housing portion 12, the pedestal 10 is then in the open condition. In the open condition (i.e., the second pedestal housing portion 14 lifted and separated from the first pedestal housing portion 12), the at least one of utility/communication lines and connections therefor are accessible to a technician worker.

As mentioned, the aspect of open condition and closed condition is to be broadly interpreted and may depend upon the construction and configuration of the first pedestal housing portion 12 and the second pedestal housing portion 14. For example, it is contemplated that a different example pedestal may have first and second pedestal housing portions that have different relative movement (e.g., perhaps a relative horizontal or pivot movement) between an open condition and a closed condition. Also, for example, it is contemplated that the second pedestal housing portion may be considered as a door that is located upon the first pedestal housing portion, with the first pedestal housing portion providing a substantial amount of the overall pedestal. For such, the second pedestal housing portion is relatively movable so as to provide the open condition and the closed condition. Of course, the relative movement may be dependent upon structure of the first and second pedestal housing portions. So, the type of movement may be any associated movement, such as removal, pivoting, lifting, etc. Thus, it is to be appreciated that the pedestal may be varied and such variations are contemplated and within the scope of the present disclosure.

It is to be appreciated that there is benefit to have the ability to secure the second pedestal housing portion 14 to the first pedestal housing portion 12. In other words, secure the pedestal 10 in the closed condition. Such help to prevent weather elements (e.g., rain, snow) infiltration, dirt/debris infiltration, unauthorized tampering, etc. As such, the pedestal 10 includes a mechanical arrangement 20 to secure the second pedestal housing portion 14 to the first pedestal housing portion 12 in the closed condition.

FIGS. 2-5 show an example a mechanical arrangement 20 that includes a single, unitary component 40 of the mechanical arrangement 20. The single, unitary component 40 includes a tool engageable portion 42 for engagement by a tool and rotation of the single, unitary component by the tool. Within the shown example, the tool engageable portion 42 includes a nut head that has multiple (e.g., six) facets. Of course, the tool engageable portion 42 may be varied (e.g., to have a different number of facets or some other engageable set of faces), and such variation is with the scope of the present disclosure. It is to be appreciated rotational force (e.g., torque) is to be applied to the tool engageable portion 42 and as such the tool engageable portion may be referred to a torque portion. The tool engageable portion 42 is rotated, about a rotation point, when the rotational force (e.g., torque) is to be applied to the tool engageable portion. The entire unitary component 40 is rotated when the when the rotational force (e.g., torque) is to be applied to the tool engageable portion. In some embodiments, the single unitary component 40 includes an engageable portion, instead of a tool engageable portion, that can be engaged without using a tool, e.g. using a finger or hand.

The example single, unitary component 40 includes a hooked finger 44. The hooked finger 44 is integral to and extends from the tool engageable portion 42. The hooked finger 44 has a hook 46. The hook 46 is at a distal end of the hooked finger 44 away from the tool engageable portion 42.

Recall that the entire unitary component 40 is rotated when the rotational force (e.g., torque) is to be applied to the tool engageable portion 42. As such, the hooked finger 44 and the hook 46 thereat are moved (i.e., moved about the rotation point at the tool engageable portion 42). The hook 46 moves in an arc about the tool engageable portion 42 (specifically the rotation point at the tool engageable portion) during rotation of the entire unitary component 40.

The example single, unitary component 40 includes a resilient finger 50 that is integral to and extends from at least one of the tool engageable portion 42 and the hooked finger 44. Within the example shown within FIGS. 2-5, the resilient finger 50 extends from the hooked finger 44. The resilient finger 50 is elastically deformable. During elastic deformation, potential energy (e.g., a spring force energy) is stored via the deformation. The stored energy provides a bias force that biases the resilient finger 50 toward a non-deformed condition. So, if the resilient finger 50 is elastically deformed during rotation of the tool engageable portion 42, and thus the entire unitary component 40, the resilient finger 50 stores rotational potential energy and provides a bias force, which is a rotational bias force, back toward a non-deformed condition (i.e., in an opposite rotational direction).

It is to be appreciated that the single, unitary component 40 may be made of any of a variety of materials. For example, the single, unitary component 40 may be made of plastic. Of course, other materials are contemplated and within the scope of the present disclosure. The material of the unitary component 40 may be selected such that the resilient finger 50 is elastically deformable.

The resilient finger 50 has an engagement distal end 52. Such distal end 52 is distal (i.e., located away) from the location from which the resilient finger 50 extends. For the example shown in FIGS. 2-5, the distal end 52 of the resilient finger 50 is distal (i.e., located away) from location from which the resilient finger extends from the hooked finger 44. At the distal end 52, the resilient finger 50 has an engagement surface 54. As discussed further following the engagement surface 54 engaged within another component. Within an example, such engagement includes a camming or sliding action.

It is to be appreciated that, in order for the resilient finger 50 to be elastically deformed, the resilient finger 50 needs to bear against something during the rotation of thus the entire unitary component 40. It is to be appreciated that the resilient finger 50 may bear against a variety of items/surfaces. With the shown example, the mechanical arrangement 20 includes a component housing 56. Within the shown example, the component housing 56 is a two-part housing (compare FIGS. 5 and 6). Of course, the component housing 56 may have a variety of modifications and such variety of modifications are within the scope of the present disclosure. Moreover, it is contemplated that the mechanical arrangement may be configured to omit all or part of the component housing 56. Again, such variations are within the scope of the present disclosure.

Figure 5:
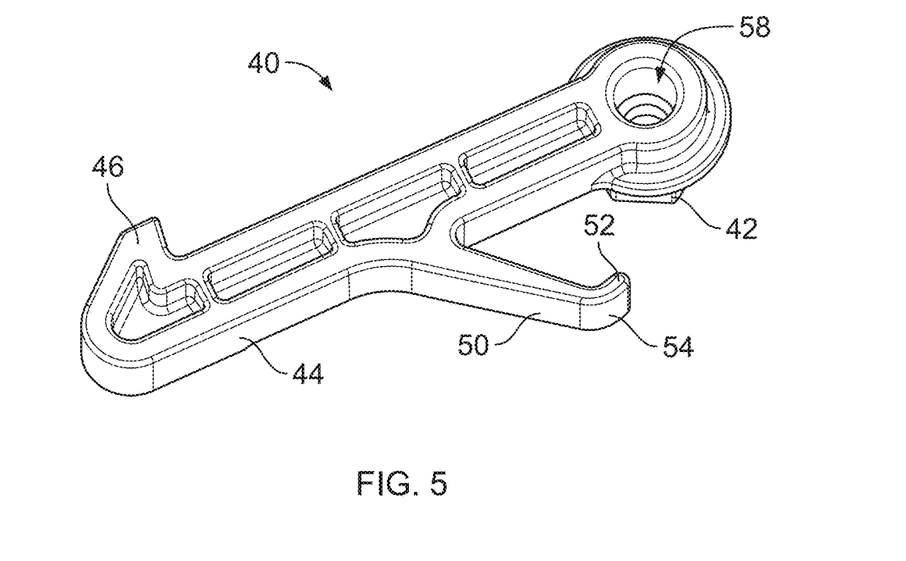
FIG. 5 is a reverse-angle perspective illustration of the single, unitary component in accordance with at least one aspect of the present disclosure.

The component housing 56 pivotally supports the unitary component 40 so that the tool engageable portion 42 is both accessible and able to pivot (i.e., rotate) about a point. FIG. 5 shows that a back side of the tool engageable portion 42 may include, in an example, a recess 58 such that a complimentary support post, not shown, of the component housing 56 may extend into the recess. For such an example, the tool engageable portion 42, and such the entire unitary component 40, rotate upon the support post, with pivoting being about a center of the support post and the center of the recess 58.

Also within the example component housing 56, a wall 62, with a bearing surface 64, is provided against which the resilient finger 50 may bear against during the rotation of the entire unitary component 40. Within the shown example, the engagement surface 54 at the distal end 52 of the resilient finger 50 engages and bears against the bearing surface 64 of the wall 62. In view of the fact that the motion of the unitary component 40 is rotational within the shown example, the bearing and associated motion may include a camming or sliding motion. It is to be appreciated that the wall/surface 62/64 may be varied and such variations are within the scope of the present disclosure. Still further, recall that it is contemplated that the mechanical arrangement 20 may be configured to omit all or part of the component housing 56. For such variation, the resilient finger 50 may bear against some other wall/surface and, such variations are within the scope of the present disclosure.

The mechanical arrangement 20 is constructed/configures such that the hooked finger 44, and the hook 46 thereon, protrude. Within the shown example, the protruding of the finger 44, and the hook 46 thereon, is from the component housing 56. The protruding of the finger 44, and the hook 46 thereon, is for interaction to provide for a securing (i.e., locking) and associated releasing functions. Specifically, the finger 44, and the hook 46 thereon, are for the ability to secure the second pedestal housing portion 14 to the first pedestal housing portion 12. As mentioned, the pedestal 10 includes the mechanical arrangement 20 to secure the second pedestal housing portion 14 to the first pedestal housing portion 12 in the closed condition. So, the rotation of the single, unitary component 40, and thus the finger 44 and the hook 46 thereon, provides for securing (i.e., locking) and releasing functions. The resilient finger 50 provides the bias force to help retain the finger 44, and the hook 46 thereon, in the securing (i.e., locking) rotational position.

Attention is directed to the series of FIGS. 6-9. The mechanical arrangement 20 is located/mounted upon the second pedestal housing portion 14. The finger 44, and the hook 46 thereon, is for interaction with a catch (e.g., a projection) 72 that is located/mounted upon the first pedestal housing portion 12. It is to be appreciated that the catch (e.g., a projection) 72 may have any suitable shape/size so as to interact with the finger 44, and the hook 46 thereon. The interaction is so that when the first pedestal housing portion 12 and the second pedestal housing portion 14 are in the closed condition, the hook 46 may interact with the catch 72 to prevent the second pedestal housing portion from moving relative to the first pedestal housing portion to the open condition. Such occurs when the finger 44, and the hook 46 thereon, are in a locking position (i.e., the unitary component 40 is in a locking rotational position). See FIG. 8. So, when the first pedestal housing portion 12 and the second pedestal housing portion 14 are in the closed condition, the hook 46 may interact with the catch 72 to prevent the second pedestal housing portion from moving relative to the first pedestal housing portion to the open condition. The interaction is also so that when the finger 44, and the hook 46 thereon, are in an unlocking position (i.e., the unitary component 40 is in an unlocking rotational position), the first pedestal housing portion 12 and the second pedestal housing portion 14 may be relatively moved from the closed condition to the open condition. See FIG. 9.

Within the shown example of FIGS. 6-9, the catch 72 is shown as a projection that is integrally molded as part of the first pedestal housing portion 12 at a location that receives the mechanical arrangement 20. Moreover, within the shown example of FIGS. 6-9, the projection 72 extends in the plane within which the unitary component 40 rotates/pivots and extends in the plane within which the hook 46 extends from the finger 44. Of course, variations to the projection 72 are contemplated and within the scope of the present disclosure. It is to be noted that mechanical arrangement 20, including the hooked finger 44 and the hook 46 thereon, and the catch (e.g., a projection) 72 may be modified via switching of location/mounting such that the mechanical arrangement 20 is located/mounted on the first pedestal housing portion 12 and the catch (e.g., projection) 72 is located/mounted upon the second pedestal housing portion 14. Such type of variations is contemplated and within the scope of the present disclosure.

Figure 6:
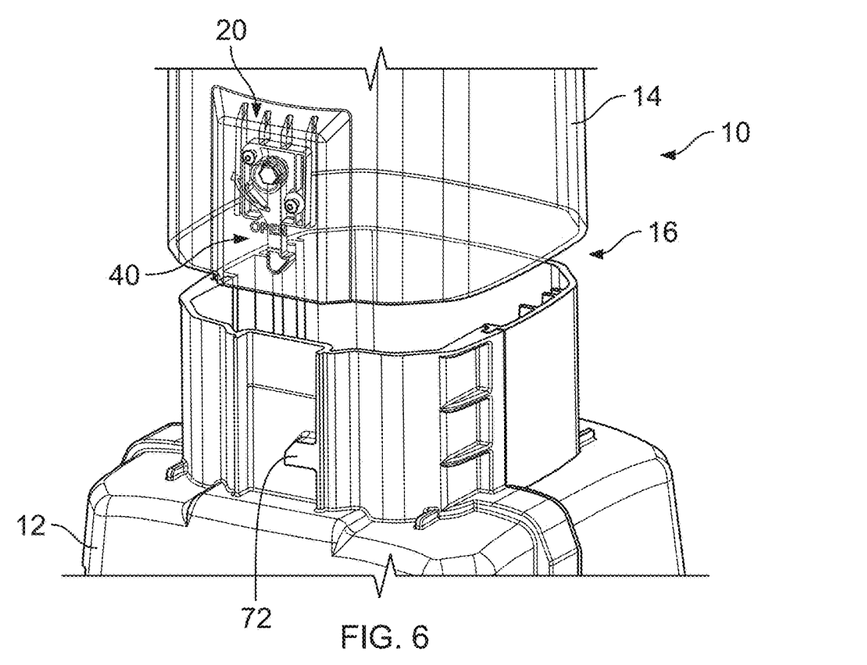
FIG. 6 is a partially torn away, and partially transparent, illustration of an example pedestal including the mechanical arrangement having a single, unitary component of FIGS. 4 and 5, to secure the access to a pedestal, in accordance with at least one aspect of the present disclosure, and shows portions of the pedestal separated and not closed together.

Focusing now upon the sequence FIGS. 6-9, attention is first directed to FIG. 6. Within FIG. 9, the example pedestal 10 is shown in the open condition (i.e., the second pedestal housing portion 14 is vertically positioned up from the first pedestal housing portion 12). Recall that in the open condition (i.e., the second pedestal housing portion 14 lifted and separated from the first pedestal housing portion 12), the at least one of utility/communication lines and connections therefor that may be located within the hollow interior 16 are accessible to a technician worker.

Figure 7:
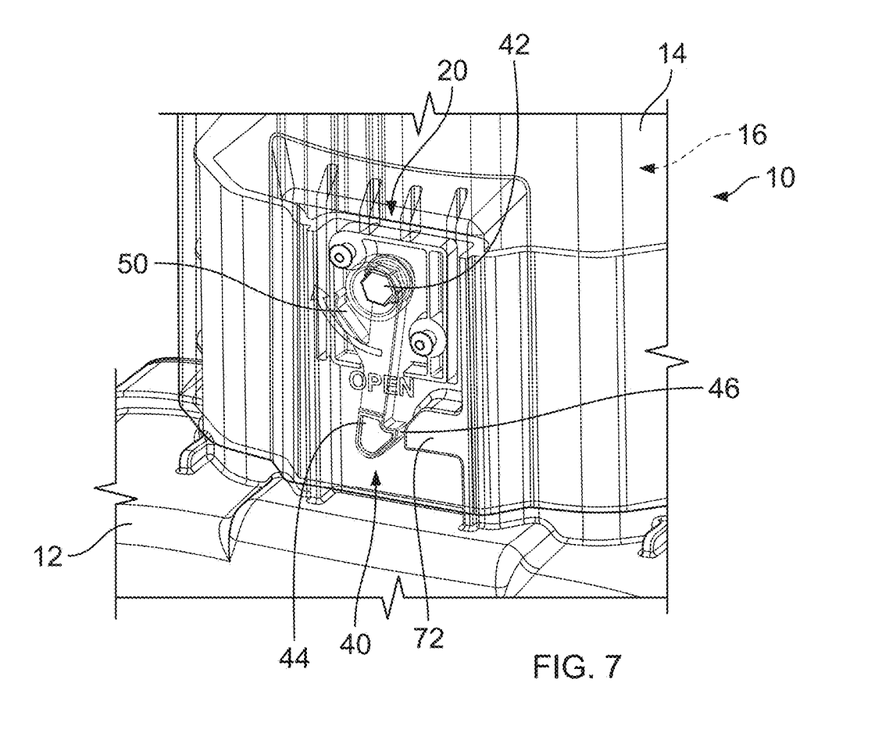
FIG. 7 is an enlarged illustration similar to FIG. 6, but shows the portions of the pedestal moved to be nearly closed together and with a resilient, integral portion of the single, unitary component being elastically deformed to provide a bias force, in accordance with at least one aspect of the present disclosure.

Within FIG. 7, in comparison to FIG. 6, the second pedestal housing portion 14 is located vertically downward relative to the first pedestal housing portion 12. More specifically, the mechanical arrangement 20 is now in proximity to the projection 72. The hook 46 of the hooked finger 44 is in engagement with the projection 72. The engagement cams and rotates the hook 46, and thus the unitary component 40. Such occurs automatically. Within FIG. 7, the rotation of the unitary component 40 is clockwise. Of course, other movements are contemplated and within the scope of the present disclosure. Further within FIG. 7, note that the resilient finger 50 is being elastically deformed. Again, such occurs automatically. As such the resilient finger 50 is providing as force (i.e., bias force) urging the unitary component 40 to rotate counterclockwise (as viewed within FIG. 7).

Figure 8:
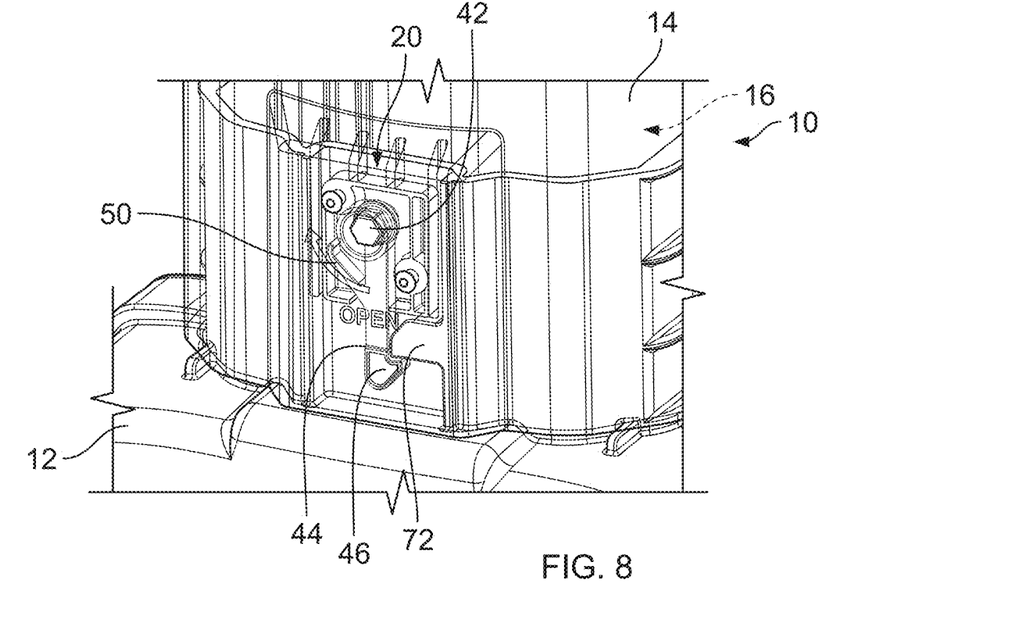
FIG. 8 is an illustration similar to FIG. 7, but shows the portions of the pedestal moved to be closed together and with the single, unitary component being moved toward a securing position via the bias force, in accordance with at least one aspect of the present disclosure.
Figure 9:
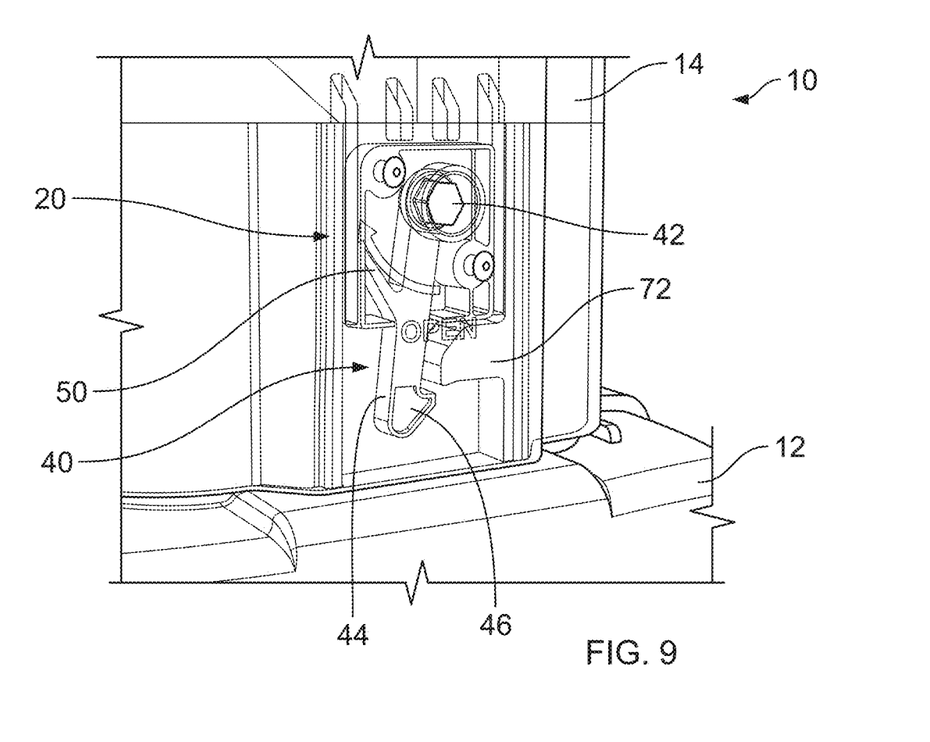
FIG. 9 is an illustration showing the portions of the single, unitary component of FIGS. 4 and 5, rotated from the securing position such that the portions of the pedestal may be separated, and with the resilient, integral portion of the single, unitary component being elastically deformed to provide a bias force, in accordance with at least one aspect of the present disclosure.

Turning now to FIG. 8, the second pedestal housing portion 14 is now located in the closed position relative to the first pedestal housing portion 12. Note that the hook 46 of the hooked finger 44 has moved below the projection (i.e., the catch) 72. Moreover, the hook 46 of the hooked finger 44 is below the projection 72 and is in engagement with the projection. As such, the hook 46 interacts with projection (i.e., the catch) 72 to prevent the second pedestal housing portion 14 from moving (e.g., upward movement) relative to the first pedestal housing portion 12 towards the open condition. It is to be appreciated that the movement (e.g., counterclockwise rotation as viewed in FIG. 8) of the unitary component 40 is via the bias force provided by the resilient finger 50. Here also, the movement is automatic via the bias force of the resilient finger 50 of the unitary component 40.

Figure 10:
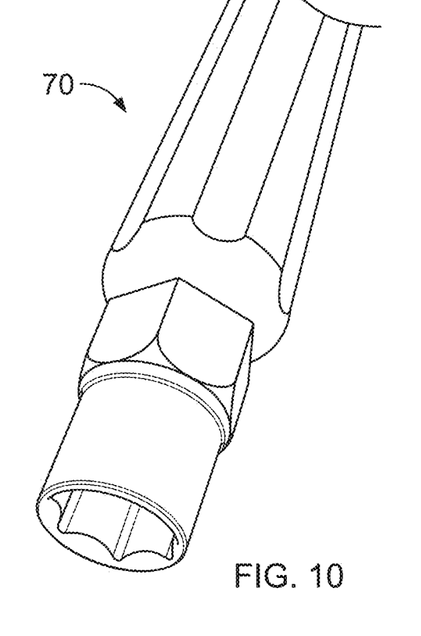
FIG. 10 is an example of a specialized tool that may be used to rotate the single, unitary component of FIGS. 4 and 5, when the single, unitary component is within the mechanical arrangement that is within the pedestal, in accordance with at least one aspect of the present disclosure.

As mentioned, the unitary component 40 includes the tool engageable portion 42 for engagement by a tool. FIG. 10 shows an example of such a tool 70. The tool 70 may be used to rotate (e.g., clockwise as viewed in FIG. 8) the unitary component 40. As such, the tool 70 is used to "unlock" the pedestal 10 so that second pedestal housing portion 14 may be moved (e.g., removed) relative to the first pedestal housing portion 12 from the closed condition to the open condition.

Figure 11:
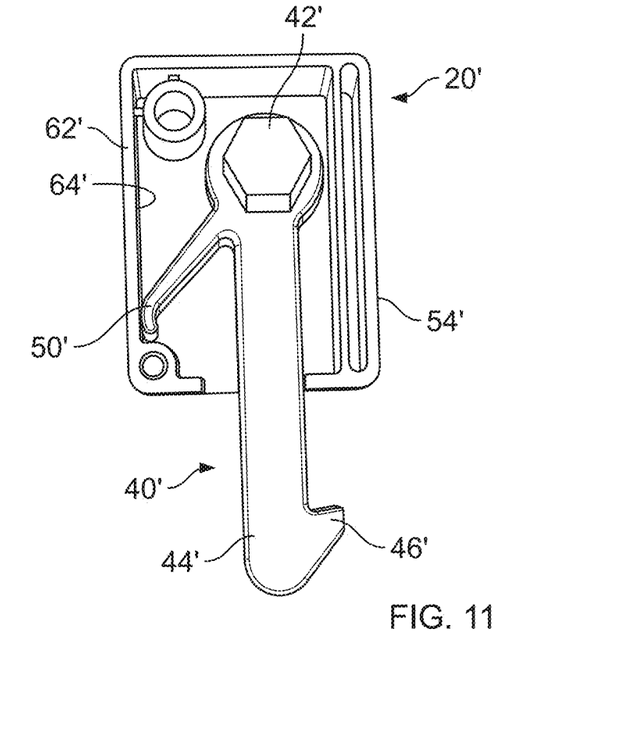
FIG. 11 is picture similar to FIG. 2, but shows another example of a single, unitary component, to secure the access to a pedestal, in accordance with at least one aspect of the present disclosure.
Figure 12:
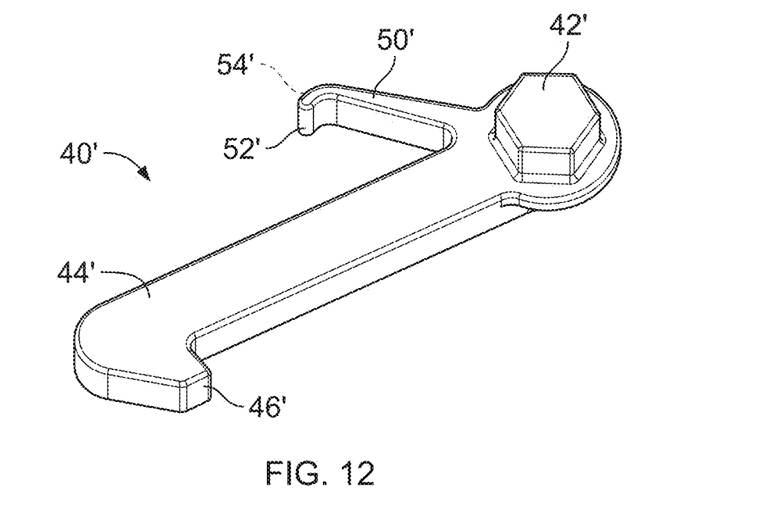
FIG. 12 is a perspective illustration of the single, unitary component of FIG. 11, in accordance with at least one aspect of the present disclosure.
Figure 13:
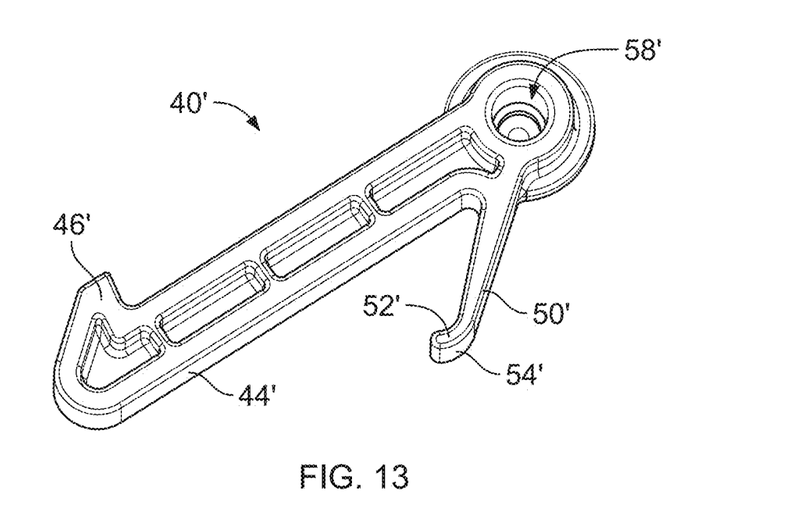
FIG. 13 is a reverse-angle perspective illustration of the single, unitary component of FIG. 11, in accordance with at least one aspect of the present disclosure.

As mentioned, the unitary component 40, and the mechanical arrangement 20 that contains the unitary component 40, may be varied and such variation is within the scope of the present disclosure. FIGS. 11-13 show an example of such variation. In general, a unitary component 40', of FIGS. 11-13 contains several same/similar portions/functions. As such, the reference numerals utilized to describe the unitary component 40, and the mechanical arrangement 20, of FIGS. 2-5 are also utilized for the unitary component 40' and the mechanical arrangement 20' of FIGS. 11-13, but with a prime ("'") added. In general, the descriptions provided for the unitary component 40 and the mechanical arrangement 20 of FIGS. 2-5 are generally applicable to the unitary component 40' and the mechanical arrangement 20' of FIGS. 11-13.

It is to be noted that the resilient finger 50' that is integral to and extends from at least one of the tool engageable portion 42' and the hooked finger 44'. But, within the example shown within FIGS. 11-13, the resilient finger 50' extends from the tool engageable portion 42'.

Again, it is to be appreciated that the inventive aspect of the unitary component (e.g., 40, 40' and other variants within the scope of the present disclosure) provide for efficiencies. Such efficiencies include reducing complexity, reducing the number of components, reducing assembly time, reducing costs of separate component, etc.

Figure 14:
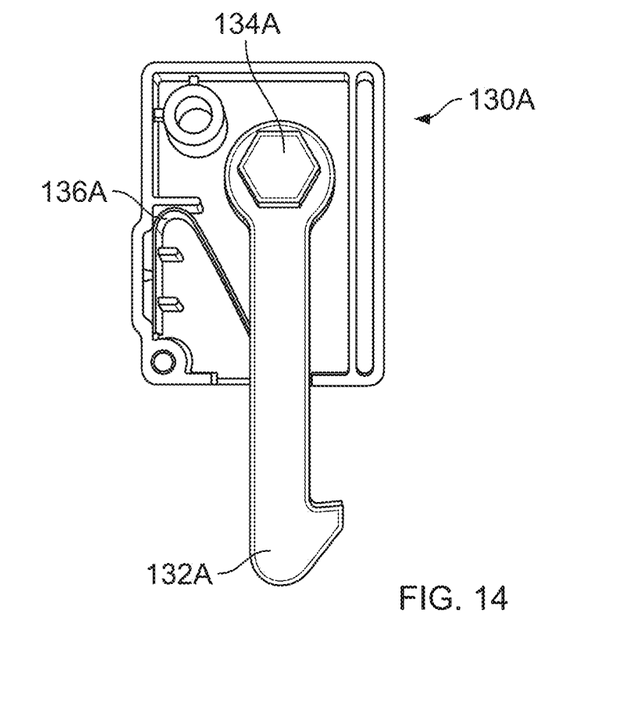
FIG. 14 is a picture of another mechanical arrangement to secure the access to a pedestal, in accordance with at least one aspect of the present disclosure.
Figure 15:
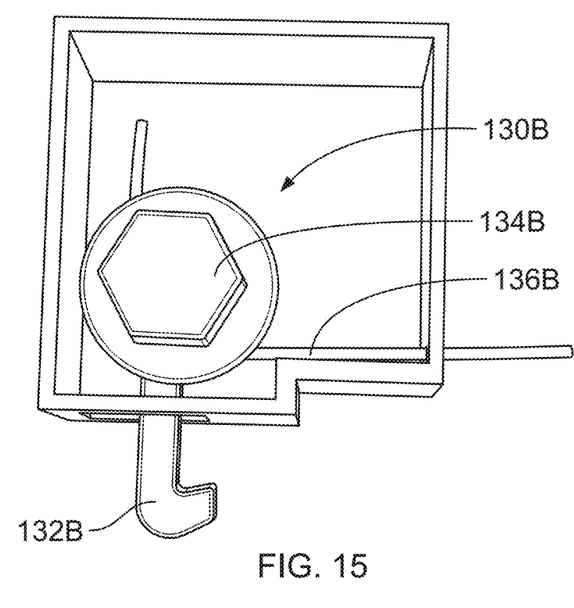
FIG. 15 is a picture of another mechanical arrangement to secure the access to a pedestal, in accordance with at least one aspect of the present disclosure.

It is to be appreciated that the present disclosure provides other mechanical arrangements to secure a second pedestal housing portion to a first pedestal housing portion in the closed condition. Such provides at least some of the aspects of the present disclosure. FIGS. 14 and 15 show some examples of mechanical arrangements 130A and 130B. The mechanical arrangements 130A and 130B each respectively have a latching arm 132A, 132B (e.g., providing a latching function), a torque receiving element 134A, 134B that is engageable by a tool (e.g., providing a torquing function) and a spring 136A, 136B (e.g., providing a spring/biasing function).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

It is to be appreciated that although some of the presented examples are shown and described in use with a pedestal which may be for utility/communication lines and connections therefor, the present disclosure is not so limited. It is contemplated, and thus within the scope of the present disclosure, that use may be with structure(s) other than with such pedestals that are for utility/communication lines and connections therefor.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first location and a second location correspond to location A and location B or two different or two identical locations or the same location.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above-described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed:

1. A pedestal to securely house at least one of utility/communication lines or connections therefor, the pedestal comprising:
    a first pedestal housing portion;
    a second pedestal housing portion, the second pedestal housing portion being movable relative to the first pedestal housing portion between an open condition and a closed condition, the first pedestal housing portion and the second pedestal housing portion providing an interior for the at least one of utility/communication lines or connections therefor; and
    a mechanical arrangement to secure the second pedestal housing portion to the first pedestal housing portion in the closed condition, the mechanical arrangement comprising:
        a single, unitary component rotationally mounted relative to one of the first pedestal housing portion or the second pedestal housing portion;
        a component housing associated with the single, unitary component and fixed relative to the one of the first pedestal housing portion or the second pedestal housing portion; and
        a catch located on the other of the first pedestal housing portion or the second pedestal housing portion,
        the single, unitary component comprising:
            a tool engageable portion for engagement by a tool and rotation of the single, unitary component by the tool;
            a hooked finger integral to and extending from the tool engageable portion and having a hook at a distal end of the hooked finger away from the tool engageable portion, with the hook moving in an arc about the tool engageable portion during rotation of the single, unitary component and, when the first pedestal housing portion and the second pedestal housing portion are in the closed condition, the hook may interact with the catch to inhibit the second pedestal housing portion from moving relative to the first pedestal housing portion to the open condition; and
            a resilient finger integral to and extending from at least one of the tool engageable portion or the hooked finger and having an engagement distal end, the engagement distal end of the resilient finger engageable with a surface of the component housing with the resilient finger resiliently deforming during rotation of the single, unitary component in a rotational direction to move the hook away from the catch and the resilient finger resiliently biasing the hook toward the catch to interact with the catch to inhibit the second pedestal housing portion from moving relative to the first pedestal housing portion to the open condition.

2. The pedestal as set forth in claim 1, wherein the resilient finger extends from the hooked finger.

3. The pedestal as set forth in claim 1, wherein the resilient finger extends from the tool engageable portion.

4. The pedestal as set forth in claim 1, wherein the component housing is fixed relative to the second pedestal housing portion and the catch is located on the first pedestal housing portion.

5. The pedestal as set forth in claim 1, wherein the mechanical arrangement is configured to automatically secure the second pedestal housing portion to the first pedestal housing portion as the second pedestal housing portion is moved relative to the first pedestal housing portion toward the closed condition due to the resilient finger resiliently biasing the hook toward the catch.

6. The pedestal as set forth in claim 1, wherein the resilient finger automatically elastically deforms as the second pedestal housing portion is moved relative to the first pedestal housing portion toward the closed condition due to the engagement distal end of the resilient finger engaging with the surface of the component housing.

7. The pedestal as set forth in claim 1, wherein the resilient finger has a cam surface at the engagement distal end for camming against the surface of the component housing.

8. A mechanical arrangement for a pedestal that securely houses at least one of utility/communication lines or connections therefor, the pedestal comprising a first pedestal housing portion and a second pedestal housing portion where the second pedestal housing portion is movable relative to the first pedestal housing portion between an open condition and a closed condition, the mechanical arrangement comprising:
    a single, unitary component rotationally mounted relative to one of the first pedestal housing portion or the second pedestal housing portion;
    a component housing associated with the single, unitary component and fixed relative to the one of the first pedestal housing portion or the second pedestal housing portion; and
    a catch located on the other of the first pedestal housing portion or the second pedestal housing portion,
    the single, unitary component comprising:
        a tool engageable portion for engagement by a tool and rotation of the single, unitary component by the tool;
        a hooked finger integral to and extending from the tool engageable portion and having a hook at a distal end of the hooked finger away from the tool engageable portion, with the hook moving in an arc about the tool engageable portion during rotation of the single, unitary component and, when the first pedestal housing portion and the second pedestal housing portion are in the closed condition, the hook may interact with the catch to inhibit the second pedestal housing portion from moving relative to the first pedestal housing portion to the open condition; and a resilient finger integral to and extending from at least one of the tool engageable portion or the hooked finger and having an engagement distal end, the engagement distal end of the resilient finger engageable with a surface of the component housing with the resilient finger resiliently deforming during rotation of the single, unitary component in a rotational direction to move the hook away from the catch and the resilient finger resiliently biasing the hook toward the catch to interact with the catch to inhibit the second pedestal housing portion from moving relative to the first pedestal housing portion to the open condition.

9. The mechanical arrangement as set forth in claim 8, wherein the resilient finger extends from the hooked finger.

10. The mechanical arrangement as set forth in claim 8, wherein the resilient finger extends from the tool engageable portion.

11. The mechanical arrangement as set forth in claim 8, wherein the component housing is fixed relative to the second pedestal housing portion and the catch is located on the first pedestal housing portion.

12. The mechanical arrangement as set forth in claim 8, wherein the mechanical arrangement is configured to automatically secure the second pedestal housing portion to the first pedestal housing portion as the second pedestal housing portion is moved relative to the first pedestal housing portion toward the closed condition due to the resilient finger resiliently biasing the hook toward the catch.

13. The mechanical arrangement as set forth in claim 8, wherein the resilient finger automatically elastically deforms as the second pedestal housing portion is moved relative to the first pedestal housing portion toward the closed condition due to the engagement distal end of the resilient finger engaging with the surface of the component housing.

14. A single, unitary component of a mechanical arrangement, the mechanical arrangement comprising a component housing associated with the single, unitary component and fixed relative to one of a first housing portion or a second housing portion, and a catch located on the other of the first housing portion or the second housing portion, the single, unitary component comprising:
 a tool engageable portion for engagement by a tool and rotation of the single, unitary component by the tool;
 a hooked finger integral to and extending from the tool engageable portion and having a hook at a distal end of the hooked finger away from the tool engageable portion, with the hook moving in an arc about the tool engageable portion during rotation of the single, unitary component and, when the first housing portion and the second housing portion are in a closed condition, the hook may interact with the catch to inhibit the second housing portion from moving relative to the first housing portion to an open condition; and
 a resilient finger integral to and extending from at least one of the tool engageable portion or the hooked finger and having an engagement distal end, the engagement distal end of the resilient finger engageable with a surface of the component housing with the resilient finger resiliently deforming during rotation of the single, unitary component in a rotational direction to move the hook away from the catch and the resilient finger resiliently biasing the hook toward the catch to interact with the catch to inhibit the second housing portion from moving relative to the first housing portion to the open condition.

15. The unitary component as set forth in claim 14, wherein the resilient finger extends from the hooked finger.

16. The unitary component as set forth in claim 14, wherein the resilient finger extends from the tool engageable portion.

17. The unitary component as set forth in claim 14, wherein the component housing is fixed relative to the second housing portion and the catch is located on the first housing portion.

18. The unitary component as set forth in claim 14, wherein the mechanical arrangement is configured to automatically secure the second housing portion to the first housing portion as the second housing portion is moved relative to the first housing portion toward the closed condition due to the resilient finger resiliently biasing the hook toward the catch.

19. The unitary component as set forth in claim 14, wherein the resilient finger automatically elastically deforms as the second housing portion is moved relative to the first housing portion toward the closed condition due to the engagement distal end of the resilient finger engaging with the surface of the component housing.

20. The unitary component as set forth in claim 18, wherein the resilient finger has a cam surface at the engagement distal end for camming against the surface of the associated component housing.

* * * * *